United States Patent
Clark et al.

(10) Patent No.: US 12,406,442 B2
(45) Date of Patent: Sep. 2, 2025

(54) EXTENDED REALITY FOR MOVING PLATFORMS

(71) Applicant: Apple Inc., Cupertino, CA (US)

(72) Inventors: Brian C. Clark, Palo Alto, CA (US); Krishna Ramamurthi, San Francisco, CA (US); Ivan Kolesov, Millbrae, CA (US); Ralf Habel, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 17/478,777

(22) Filed: Sep. 17, 2021

(65) Prior Publication Data

US 2022/0092860 A1   Mar. 24, 2022

Related U.S. Application Data

(60) Provisional application No. 63/080,623, filed on Sep. 18, 2020.

(51) Int. Cl.
| | | |
|---|---|---|
| *G06T 19/00* | (2011.01) | |
| *G06F 3/0346* | (2013.01) | |
| *G06F 3/04815* | (2022.01) | |
| *G06V 20/20* | (2022.01) | |

(52) U.S. Cl.
CPC .......... *G06T 19/006* (2013.01); *G06F 3/0346* (2013.01); *G06F 3/04815* (2013.01); *G06V 20/20* (2022.01)

(58) Field of Classification Search
CPC .... G06F 3/0346; G06F 3/04815; G06F 3/011; G06V 20/20; G06V 10/70; G06V 20/56; G06T 19/006
See application file for complete search history.

(56) References Cited

U.S. PATENT DOCUMENTS

| | | | | |
|---|---|---|---|---|
| 9,253,416 | B2 * | 2/2016 | Dunn | H04N 5/272 |
| 9,766,075 | B2 | 9/2017 | Foxlin | |
| 10,111,620 | B2 | 10/2018 | Miller | |
| 10,663,298 | B2 * | 5/2020 | Ali | G06T 7/248 |
| 10,984,242 | B1 * | 4/2021 | Atlas | G06F 3/0346 |
| 2002/0194914 | A1 * | 12/2002 | Foxlin | G01C 21/12 |
| | | | | 73/514.01 |
| 2011/0082585 | A1 | 4/2011 | Scrutton et al. | |

(Continued)

FOREIGN PATENT DOCUMENTS

| | | |
|---|---|---|
| CN | 107111340 A | 8/2017 |
| CN | 108427479 A | 8/2018 |
| CN | 110402368 A | 11/2019 |

OTHER PUBLICATIONS

Chinese Office Action from Chinese Patent Application No. 202111097591.5, dated Mar. 26, 2024, 21 pages including English language translation.

*Primary Examiner* — Motilewa Good-Johnson
(74) *Attorney, Agent, or Firm* — BAKERHOSTETLER

(57) ABSTRACT

Implementations of the subject technology provide extended reality display devices that can be used on and/or off of a moving platform. Systems and methods are disclosed for separating out the motion of the moving platform from other motions of the device so that virtual content can be displayed without erroneous motions caused by the motion of the moving platform. The subject technology can provide extended reality settings on any suitable moving platform such as in a car, a watercraft, an aircraft, a train, or any other vehicle.

20 Claims, 10 Drawing Sheets

(56) References Cited

U.S. PATENT DOCUMENTS

| | | | |
|---|---|---|---|
| 2017/0004630 A1* | 1/2017 | Al-Hamad | G06T 7/74 |
| 2017/0030716 A1* | 2/2017 | Ali | B60W 50/14 |
| 2018/0258350 A1 | 9/2018 | Al-Hamad | |
| 2018/0372499 A1 | 12/2018 | Ali et al. | |
| 2019/0041980 A1 | 2/2019 | Trythall | |
| 2019/0156584 A1 | 5/2019 | Herman et al. | |
| 2019/0384383 A1* | 12/2019 | Lee | G06F 3/011 |
| 2020/0111256 A1* | 4/2020 | Bleyer | G06F 3/011 |
| 2020/0151943 A1* | 5/2020 | Navarrette | G02B 27/01 |
| 2020/0271450 A1* | 8/2020 | Gorur Sheshagiri | G06F 3/0346 |
| 2021/0042992 A1* | 2/2021 | Newman | G06T 19/006 |
| 2021/0056762 A1* | 2/2021 | Robbe | G06F 16/2282 |
| 2021/0327146 A1* | 10/2021 | Buerli | G06T 19/20 |
| 2021/0366192 A1* | 11/2021 | Brimhall | G06T 15/06 |
| 2022/0070365 A1* | 3/2022 | Miller-Vedam | G06T 7/70 |

\* cited by examiner

EXTENDED REALITY FOR MOVING PLATFORMS

RELATED APPLICATIONS

This application claims the benefit of priority to U.S. Provisional Patent Application No. 63/080,623, entitled "Extended Reality For Moving Platforms," filed on Sep. 18, 2020, the disclosure of which is hereby incorporated herein in its entirety.

TECHNICAL FIELD

The present description relates generally to extended reality settings.

BACKGROUND

Virtual reality technology aims to provide a virtual environment. Augmented reality technology aims to bridge a gap between virtual environments and a physical environment by providing an enhanced physical environment that is augmented with electronic information. As a result, the electronic information appears to be part of the physical environment as perceived by a user. However, it can be challenging to determine how to control the motion of electronic information displayed in a virtual or physical environment, particularly for portable electronic devices that are free to be moved within the physical environment.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1A:
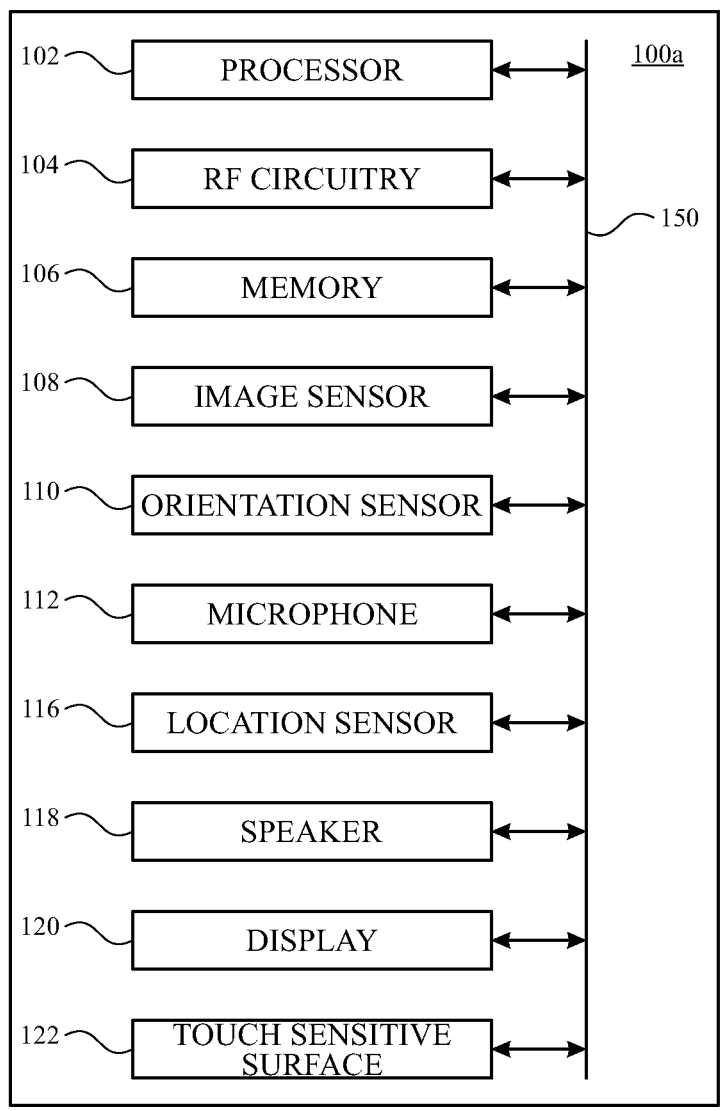
FIGS. 1A-1B depict exemplary systems for use in various extended reality technologies, including virtual reality and mixed reality in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Physical settings are those in the world where people can sense and/or interact without use of electronic systems. For example, a room is a physical setting that includes physical elements, such as, physical chairs, physical desks, physical lamps, and so forth. A person can sense and interact with these physical elements of the physical setting through direct touch, taste, sight, smell, and hearing.

In contrast to a physical setting, an extended reality (XR) setting refers to a computer-produced environment that is partially or entirely generated using computer-produced content. While a person can interact with the XR setting using various electronic systems, this interaction utilizes various electronic sensors to monitor the person's actions, and translates those actions into corresponding actions in the XR setting. For example, if a XR system detects that a person is looking upward, the XR system may change its graphics and audio output to present XR content in a manner consistent with the upward movement. XR settings may respect laws of physics to mimic physical settings.

Concepts of XR include virtual reality (VR) and augmented reality (AR). Concepts of XR also include mixed reality (MR), which is sometimes used to refer to the spectrum of realities from between physical settings (but not including physical settings) at one end and VR at the other end. Concepts of XR also include augmented virtuality (AV), in which a virtual or computer-produced setting integrates sensory inputs from a physical setting. These inputs may represent characteristics of a physical setting. For example, a virtual object may take on a color captured, using an image sensor, from the physical setting. Or, an AV setting may adopt current weather conditions of the physical setting.

Some electronic systems for implementing XR operate with an opaque display and one or more imaging sensors for capturing video and/or images of a physical setting. In some implementations, when a system captures images of a physical setting, and displays a representation of the physical setting on an opaque display using the captured images, the displayed images are called a video pass-through. Some electronic systems for implementing XR operate with a transparent or semi-transparent display (and optionally with one or more imaging sensors). Such a display allows a person to view a physical setting directly through the display, and also allows for virtual content to be added to the person's field of view by superimposing the content and over the physical setting. Some electronic systems for implementing XR operate with a projection system that projects virtual objects onto a physical setting. The projector may present a holograph onto a physical setting, or may project imagery onto a physical surface, or may project onto the eyes (e.g., retina) of a person, for example.

Electronic systems providing XR settings can have various form factors. A smart phone or tablet computer may incorporate imaging and display components to provide a XR setting. A head mount system may include imaging and display components to provide a XR setting. These systems may provide computing resources for providing XR settings, and may work in conjunction with one another to provide XR settings. For example, a smartphone or a tablet can connect with a head mounted display to provide XR settings. Or, a computer may connect with home entertainment components or vehicular systems to provide an on-window display or a heads-up display. Electronic systems providing XR settings may utilize display technologies such as LEDs, OLEDs, liquid crystal on silicon, a laser scanning light source, a digital light projector, or combinations thereof. Display technologies can employ substrates, through which light is transmitted, including light waveguides, holographic substrates, optical reflectors and combiners, or combinations thereof.

Implementations of the subject technology described herein provide an XR system for displaying virtual content with an electronic device that is on or near a moving platform. Because an electronic device that displays virtual content often tracks its own motion in the physical setting in order to render the virtual content at a fixed location in a virtual or mixed reality setting, motion of the electronic device that is due to motion of a moving platform can cause undesired errors in the display of the virtual content.

For example, a virtual object can be displayed to appear at a stationary location on the floor next to a user that is seated on a train, by an electronic device that is being carried or worn (e.g., on the head) of the user. As the user turns the device (e.g., by turning their head in some examples) to look around the mixed reality setting that includes the train and the virtual object, the motion of the electronic device is detected and used to modify the displayed location of the virtual object on the display of the electronic device, so that the virtual object appears to be stationary at the location on the floor. However, when the train begins to move, the electronic device also detects this motion and may incorrectly interpret the motion as motion relative to the location at which the virtual object is displayed. In such a scenario, the electronic device may incorrectly move the location of the virtual object on the display of the electronic device to account for the motion of the train, resulting in the virtual object erroneously appearing to slide backwards down the aisle of the train.

In one or more implementations of the subject technology, XR systems are provided that detect and account for the motion of a moving platform. For example, an electronic device may detect that it is on a moving platform, and control the display of virtual content in accordance with (i) the motion of the moving platform, (ii) the device motion on the moving platform, and/or (iii) motion of one or more physical objects on or near the moving platform. As examples, the electronic device can control the display of the virtual content by using optical tracking data (e.g., and ignoring other sensor data such as some or all of the motion sensor data) to determine an anchoring location for the virtual content, by tracking both the motion of the platform relative to a fixed reference frame (e.g., using a first simultaneous localization and mapping (SLAM) system) and tracking the motion of the electronic device relative to the moving platform or the fixed reference frame (e.g., using a second SLAM system), and/or by anchoring or locking the virtual content to a reference frame that is locked to the electronic device (see, e.g., the (x", y", z") reference frame of FIG. 3).

Figure 1B:
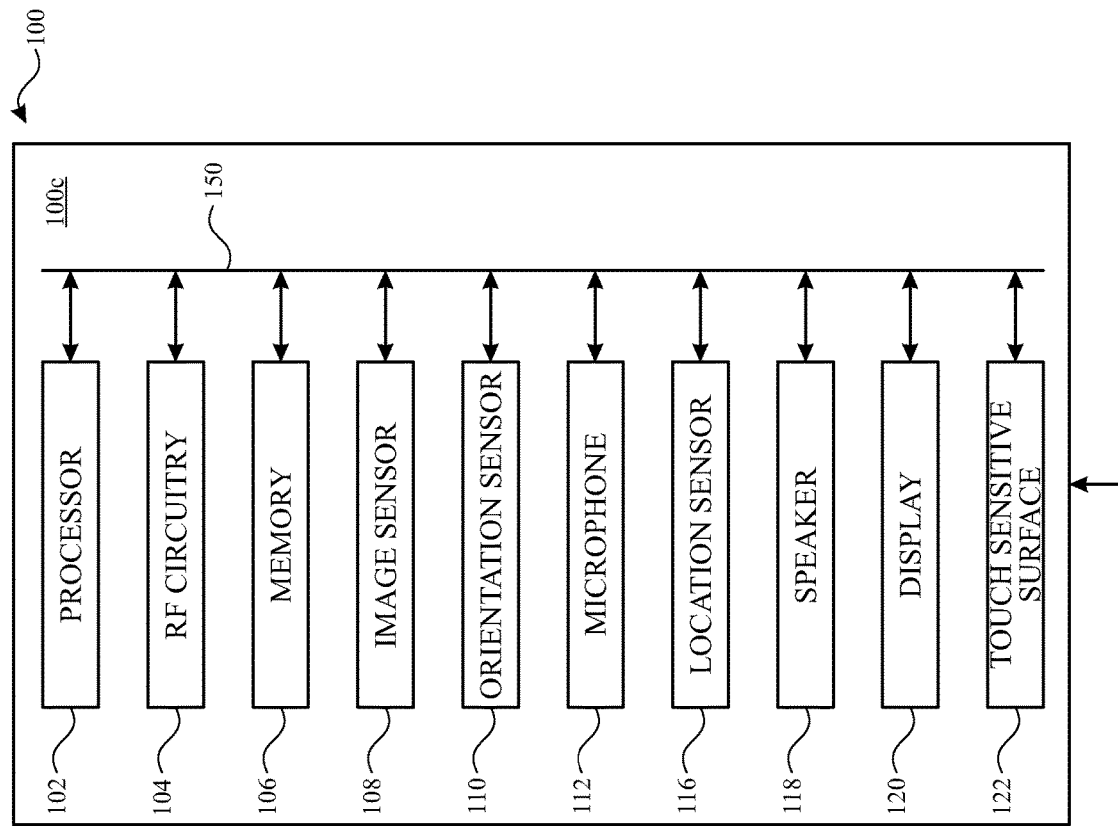
Figure 1B:
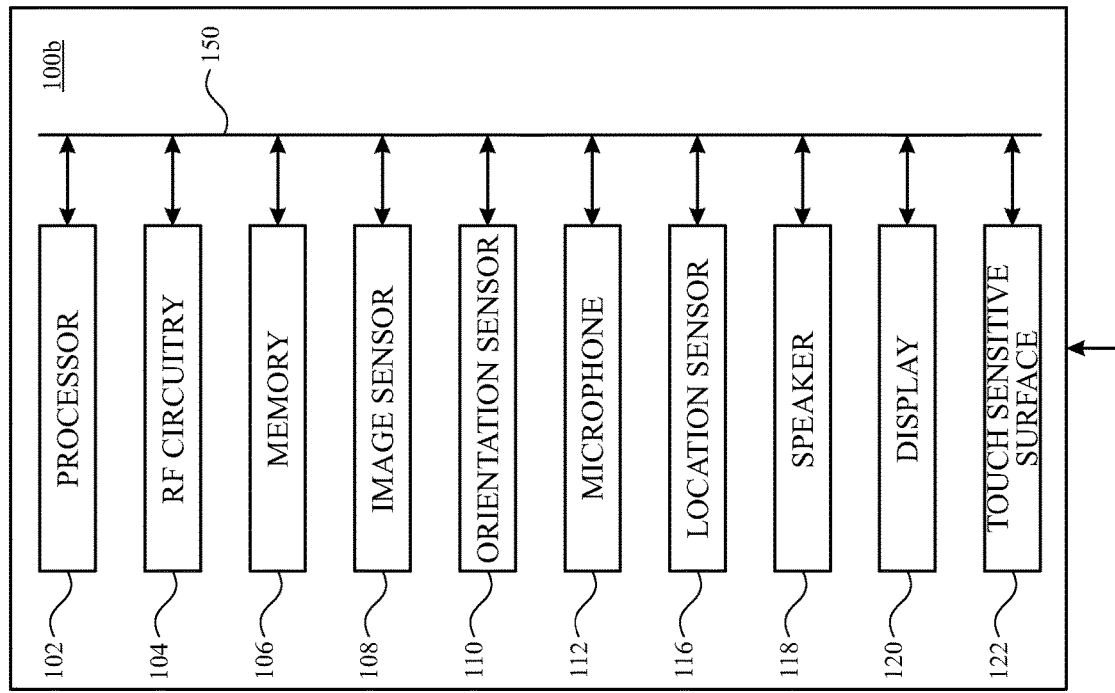

FIG. 1A and FIG. 1B depict exemplary system 100 for use in various extended reality technologies.

In some examples, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some examples, elements of system 100 are implemented in a base station device (e.g., a computing device, such as a remote server, mobile device, or laptop) and other elements of system 100 are implemented in a second device (e.g., a head-mounted device). In some examples, device 100*a* is implemented in a base station device or a second device.

As illustrated in FIG. 1B, in some examples, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical setting (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some examples, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

Figure 2:
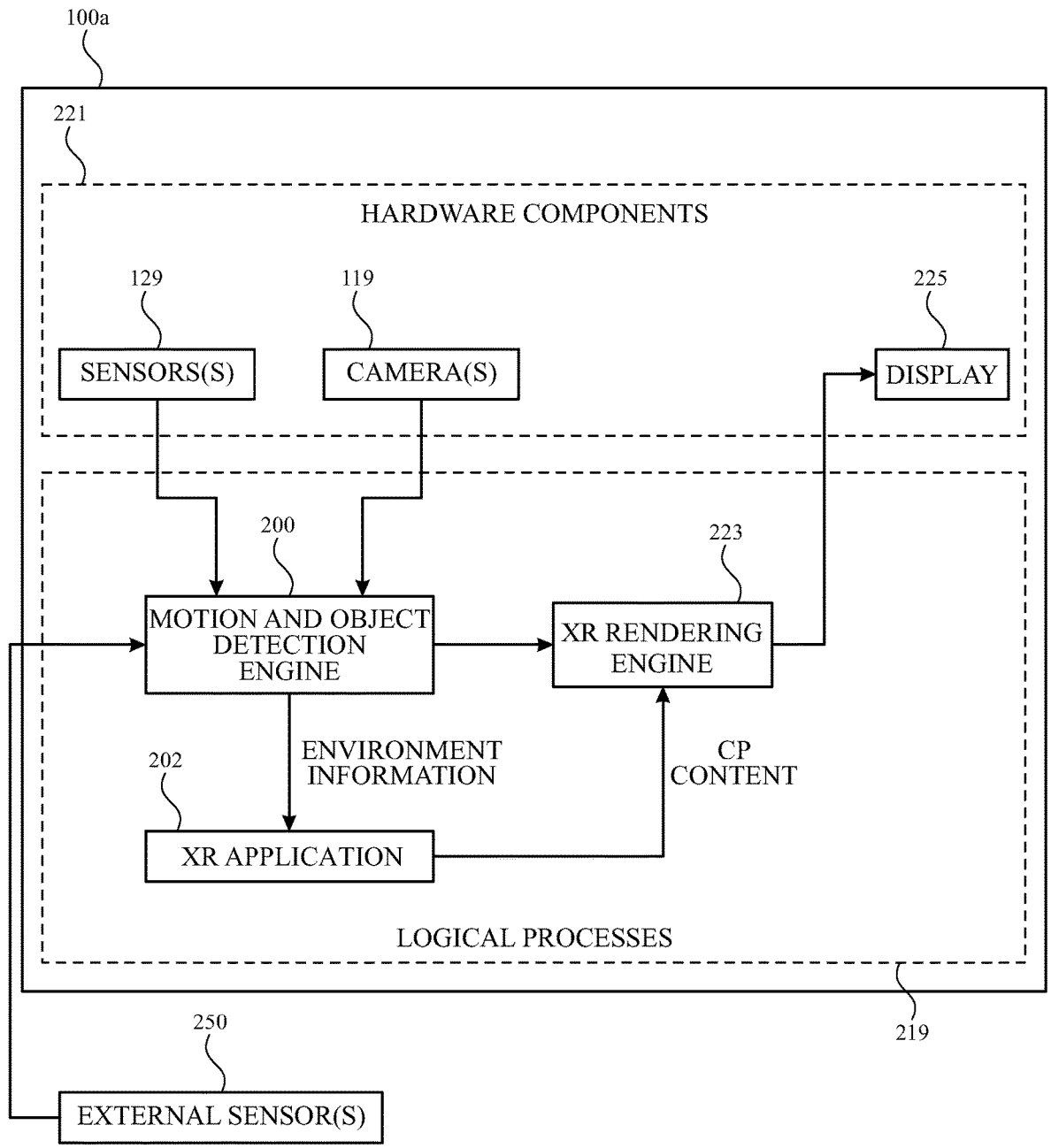
FIG. 2 illustrates an example architecture that may implement the subject technology in accordance with one or more implementations of the subject technology.

FIG. 2 illustrates an example architecture, including hardware components 221 and logical processes 219, that may be implemented on an electronic device such as the electronic device 100a, the electronic device 100b, and/or the electronic device 100c in accordance with one or more implementations of the subject technology. For explanatory purposes, portions of the logical processes 219 of the architecture of FIG. 2 are described as being implemented by the electronic device 100a of FIG. 1A, such as by a processor and/or memory of electronic device; however, appropriate portions of the architecture may be implemented by any other electronic device, including the electronic device 100b and/or the electronic device 100c. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of logical processes 219 of the architecture of FIG. 2 can be implemented in software or hardware, including by one or more processors and a memory device containing instructions, which when executed by the processor cause the processor to perform the operations described herein. In the example of FIG. 2, electronic device 100a includes sensors 129 (e.g., including implementations of one or more of image sensor 108, orientation sensor 110, and/or location sensor 116 of FIGS. 1A and 1B, and/or other sensors) that provide sensor data (e.g., depth sensor data from one or more depth sensors, location data such as global positioning system (GPS) data, Wi-Fi location data, and/or near field communications location data, and/or device motion data from one or more motion sensors such as an accelerometer, a gyroscope, a compass, an inertial measurement unit (IMU) including one or more accelerometers and/or gyroscopes and/or compasses, and/or other magnetic and motion sensors), for example, to a motion and object detection engine 200. Camera(s) 119 (e.g., implementing one or more image sensors 108) may also provide images, such as one or more video streams, to motion and object detection engine 200.

Motion and object detection engine 200 may including a simultaneous localization and mapping (SLAM) system that generates three-dimensional scene information, such as a three-dimensional map, of some or all of the physical setting of electronic device 100a using the sensor data (e.g., the depth information, location data, motion data, magnetic data, and/or images) from sensors 129 and camera(s) 119. Motion and object detection engine 200 may detect motion of the electronic device 100a (e.g., in one, two, three, four, five, or six dimensions). For example, motion and object detection engine 200 may detect up to three degrees of translational motion and/or up to three degrees of rotational motion of electronic device 100a (e.g., relative to a fixed reference frame such as a reference frame that is fixed to the surface of the Earth at or near the location of the electronic device such as the (x, y, z) reference frame in FIG. 3, and/or relative to a moving reference frame such as a reference frame that is fixed to a moving platform such as the (x', y', z') reference frame of FIG. 3).

Motion and object detection engine 200 may detect and/or identify one or more physical objects in the physical setting of the electronic device 100a (e.g., objects that are on a moving platform with the electronic device and/or objects that are not on the moving platform). Motion and object detection engine 200 may detect (e.g., using image data from camera(s) 119 and/or sensor data from sensors 129) motion of one or more detected and/or identified objects relative to the electronic device 100a and/or relative to one or more fixed or moving reference frames.

Although motion and object detection engine 200 is depicted in FIG. 2 as a single element, motion and object detection engine 200 may be implemented as multiple separate processes that are performed in series and/or in parallel for detection of device motion, for detection of motion of a moving platform, for detection and/or identification of objects, and/or for detection of motion of one or more objects. Some or all of the operations described in connection with motion and object detection engine 200 may be performed by an XR application 202 and/or by a rendering engine for computer-produced (CP) content such as XR rendering engine 223. Motion and object detection engine 200 may include a single SLAM system for tracking the motion of electronic device 100a relative to one reference frame (e.g., relative to one of a reference frame corresponding to a moving platform, such as the (x', y', z') reference frame illustrated in FIG. 3 or a fixed reference frame such as the (x, y, z) reference frame illustrated in FIG. 3) and/or one or more additional SLAM systems for tracking the motion of electronic device 100a and/or one or more additional objects relative to one or more additional reference frames (e.g., for tracking motion of electronic device 100a relative to another of the (x, y, z) or (x', y', z') reference frames and/or for tracking the motion of a moving platform relative to the fixed (x', y', z') reference frame).

As illustrated in FIG. 2, in one or more implementations, motion and object detection engine 200 may receive sensor data from one or more external sensors 250. For example, external sensors 250 may be motion and/or location sensors that are implemented as part of a moving platform, such as motion and/or location sensors that are implemented as part of a car, a plane, a train, a ship, or other moving platform. Motion and object detection engine 200 may receive sensor data from external sensors 250 and/or motion and/or location information for a moving platform, as determined by processing circuitry at the moving platform.

As illustrated in FIG. 2, an XR application 202 may receive environment information (e.g., including location information, motion information, object information, etc.) from motion and object detection engine 200. XR application 202 may be a gaming application, a media player application, a content-editor application, a training application, a simulator application, or generally any application that displays computer-produced (CP) or virtual content in a virtual setting and/or at locations that depend on the physical setting, such as by anchoring the virtual content to an anchoring location that is fixed relative to a fixed or moving reference frame in the physical setting. In one or more implementations, one or more of the XR application 202, the motion and object detection engine 200, and/or the CP rendering engine, may be a part of an operating system level process and/or framework that provides for virtual content anchoring functionality.

Motion and object detection engine 200, XR application 202, and/or XR rendering engine 223 may determine an anchoring location for virtual content to be generated by the XR application 202 based on the detected motion of the electronic device. For example, electronic device 100a (e.g., motion and object detection engine 200) may identify device motion of the electronic device 100a using one or more of sensors 129 (e.g., and/or camera 119), and may determine that the device motion includes a first component associated with a motion of a moving platform and a second component that is separate from the motion of the moving platform.

The first component and the second component of the motion of the device can be detected and/or separated from each other using one or more combinations of cameras and/or sensors on the electronic device itself and/or on the moving platform. For example, in one or more implementations, sensors on the moving platform (e.g., IMU sensors, GPS sensors, ranging sensors, magnetometers, etc.) can directly provide the first component (e.g., the platform motion) to the electronic device so that the provided platform motion can be removed from the motion indicated by the device sensors and/or cameras (e.g., with the remaining motion indicated by the device sensors, after the removal of the platform motion, corresponding to the second component of the motion of the device). In one or more other implementations, the first and second components of the device motion can be detected and/or separated using only images and/or data from the cameras and/or sensors of the electronic device (e.g., without input from external sensors on the moving platform). As examples, images and/or sensor data captured by camera(s) 119 and/or sensors 129 can be provided to one or more machine learning models that are trained to recognize characteristic motions of one or more platform types (e.g., to recognize characteristic vibrations, velocities, accelerations or physical objects in images that correspond to an airplane, a train, a bus, a car, a watercraft, a golf cart, a bicycle, or other type of platform) from the images and/or sensors and/or to recognize characteristic human motions such as walking, running, head-turning, nodding, standing, sitting, etc. that can be transferred to the electronic device when held or worn by a user. The machine learning models can be trained to output estimated first and second components of the device motion directly, and/or to identify one or more particular cameras and/or one or more particular sensors that can be used to track the motion of the platform (e.g., the first component of the device motion) and one or more particular cameras and/or one or more particular sensors that can be used to track the motion of the device (e.g., the second component of the device motion). For example, the machine learning model(s) may indicate that the device motion includes motion at a high rate of speed that is indicative of train motion, but that is constant. In this example, the output of the machine learning model(s) may indicate that the high constant velocity component of the device motion should be ignored, and that (e.g., due to the constant velocity) the accelerometer(s) of the device may continue to be used for tracking of the second component of the device motion.

The electronic device 100a may determine an anchoring location that is fixed relative to the moving platform. The determined anchoring location can be determined and/or used by XR application 202 and/or XR rendering engine 223 for display of virtual content anchored to the anchoring location that is fixed relative to the moving platform, using at least the second component of the device motion that is separate from the motion of the moving platform. For example, the second component of the device motion (e.g., the motion of the device relative to the moving platform) can be used the track the location of the electronic device 100a relative to the determined anchoring location. The virtual content (e.g., one or more virtual objects or an entire virtual setting) can be displayed anchored to the anchoring location that is fixed relative to the moving platform by rendering the virtual content anchored to the anchoring location using XR rendering engine 223 and displaying the rendered virtual content using display 225 (e.g., an implementation of display 120 of FIGS. 1A and 1B).

In any of various implementations, motion and object detection engine 200, XR application 202, and/or XR rendering engine 223 can generate anchoring locations that are fixed relative to a moving platform, anchoring locations that are fixed relative to a fixed reference frame (e.g., the (x, y, z) reference frame), anchoring locations that are associated with objects that are moving with and/or moving relative to a moving platform, anchoring locations that are associated with detected objects that are fixed relative to a fixed reference frame (e.g., objects that are not on a moving platform with the electronic device 100a), and/or anchoring locations that are fixed relative to the electronic device (e.g., for virtual objects that are meant to appear to be attached to the user's head and/or in low-power or tracking failure scenarios and fixed to the (x", y", z") reference frame).

For example, once CP content (e.g., a virtual cup, virtual document, virtual television screen, virtual movie theater screen, virtual keyboard, virtual setting, etc.) has been generated by XR application 202, the CP content can be provided to a XR rendering engine 223, as illustrated in FIG. 2. Environment information such as a depth map of the physical setting, and/or object information for detected objects in the physical setting, can also be provided to XR rendering engine 223. XR rendering engine 223 can then render the CP content from XR application 202 for display by display 225 of electronic device 100a. The CP content is rendered for display at the appropriate location on the display 225 to appear in association with the anchoring location (e.g., provided by motion and object detection engine 200). Display 225 may be, for example, an opaque display, and camera 119 may be configured to provide a video pass-through feed to the opaque display. The CP content may be rendered for display at a location on the display corresponding to the displayed location of the anchoring location in the video pass-through. Display 225 may be, as another example, a transparent or translucent display. The CP content may be rendered for display at a location on the display corresponding to a direct view, through the transparent or translucent display, of the anchoring location. Although the example of FIG. 2 illustrates an XR rendering engine 223 that is separate from XR application 202, it should be appreciated that, in some implementations, XR application 202 may render CP content for display by display 225 without using a separate XR rendering engine 223.

FIGS. 3-7 illustrate examples in which virtual content is displayed by an electronic device that is at least partially coupled to a moving platform, according to aspects of the disclosure.

Figure 3:
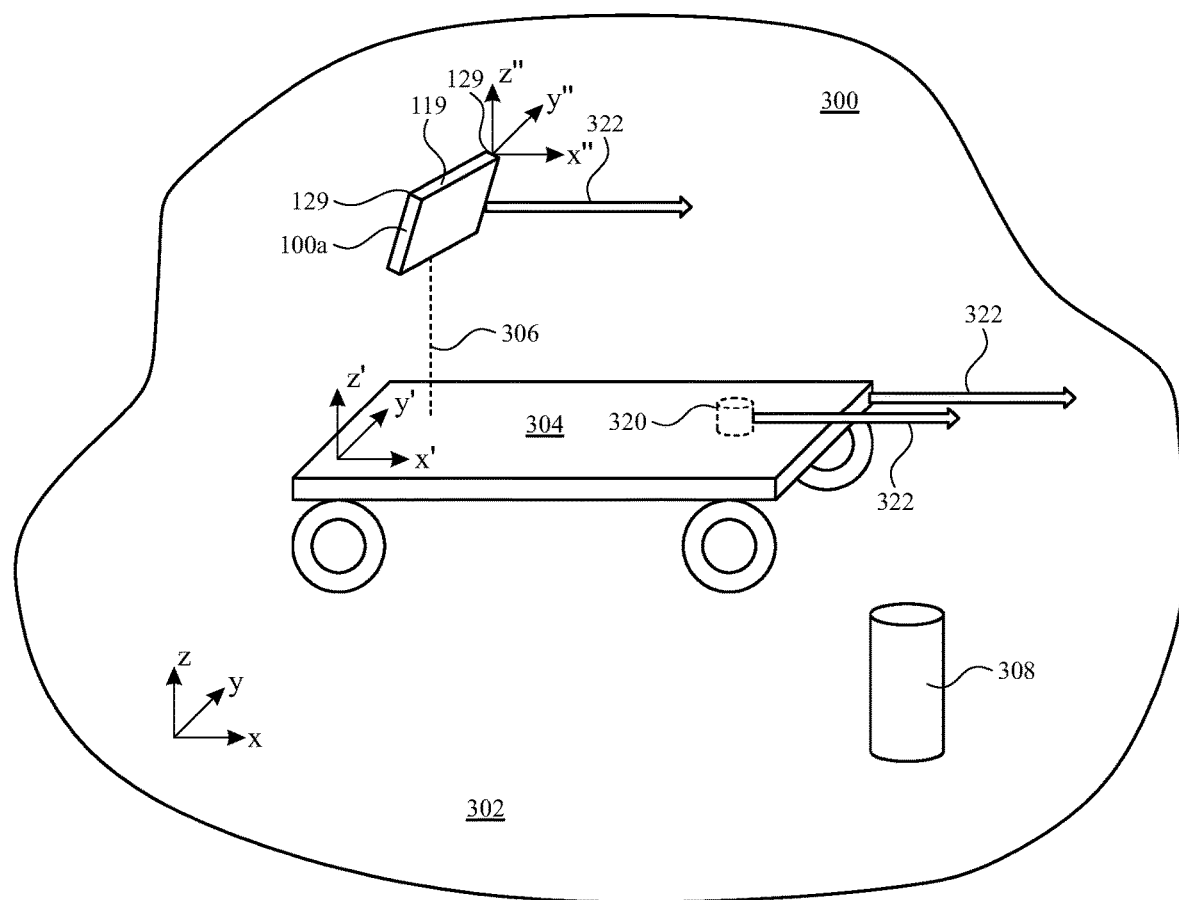
FIG. 3 illustrates an example of a physical setting of an electronic device, the physical setting including a moving platform in accordance with implementations of the subject technology.

In the example of FIG. 3, a physical setting 300 of an electronic device such as electronic device 100a includes a moving platform 304. Moving platform 304 may be implemented, as examples, as a vehicle (e.g., a car, a bus, a truck, a golf cart, or the like), a train, a watercraft (e.g., a boat, a ship, a submarine, or the like), an aircraft (e.g., an airplane, a helicopter), a skateboard, a bicycle, or any other platform that can move. In the example of FIG. 3, moving platform 304 is moving with a motion 322 (e.g., a speed and a direction) relative to the physical ground 302 in the physical setting 300. The physical ground 302 may represent, for example, the surface of the Earth (or a material that is fixed to the surface of the Earth) at or near the location of the electronic device (e.g., electronic device 100a in FIG. 3). The physical ground 302 may form the basis of a fixed reference frame (e.g., the (x, y, z) reference frame) relative to which the moving platform 304, electronic device 100a, and/or other physical objects can move. In the example of FIG. 3, the physical setting 300 also includes a physical object 308 that is stationary relative to, and may be fixed to, the physical ground 302.

In the example of FIG. 3, electronic device 100a is moving with a motion 322 that is equal to the motion 322 of the moving platform 304. For example, an electronic device such as electronic device 100a may move together with the moving platform 304 due to a coupling 306 between the electronic device and the moving platform 304. For example, coupling 306 may include the electronic device 100a being coupled to the moving platform 304 by being worn or held by a user that is sitting or standing on the moving platform, or may include other direct or indirect couplings to the moving platform 304 (e.g., due to the electronic device resting on a table, a chair, or other structure of the moving platform or being mounted to or otherwise secured to a structure of the moving platform).

As shown in FIG. 3, a virtual object 320 can be displayed by an electronic device such as electronic device 100a. In the example of FIG. 3, the virtual object 320 is rendered and displayed by electronic device 100a so as to appear to the user of electronic device 100a to be moving with the motion 322 that is equal to the motion 322 of the moving platform (e.g., so as to appear stationary on the moving platform). An electronic device such as electronic device 100a may, for example, determines that the electronic device is on a moving platform (e.g., by determining that the electronic device is moving with the motion 322 that is the same as the motion of a moving platform or by detecting a component of the device motion that is characteristic of a moving platform), and then displays the virtual object 320 at a stationary location on (or with respect to) the moving platform 304. For example, electronic device 100a may obtain but ignore the detected motion 322 of the electronic device 100a that corresponds to the motion 322 of the moving platform when determining where to display the virtual object 320. In the example of FIG. 3, virtual object 320 is displayed to appear as part of the physical setting 300. However, this is merely illustrative and it is appreciated that the virtual object 320 can be displayed to appear at a stationary location in an entirely virtual setting that is generated by electronic device 100a and moves with the moving platform 304 (e.g., by ignoring or tracking and removing the detected motion 322 of the electronic device 100a that corresponds to the motion 322 of the moving platform, when determining where to display the virtual object 320).

An electronic device such as electronic device 100a may account for the motion 322 of the electronic device that is equal to the motion 322 of the moving platform by tracking and subtracting the motion 322 of the moving platform from the detected motion of the electronic device, and/or by discontinuing use of some or all of the sensor data and/or sensors that are affected by the motion of the moving platform. For example, after determining that the electronic device is moving with the moving platform 304 using an IMU of the electronic device), an electronic device such as electronic device 100a may continue to track motion of the electronic device using optical sensors and/or depth sensors of the electronic device while discontinuing use of some or all of the IMU data after platform-related motion has been detected. For example, in a scenario in which the moving platform 304 is moving substantially in a straight line and/or without rotation, an electronic device such as electronic device 100a may continue to track motion of the electronic device using optical sensors, depth sensors, and/or one or more gyroscopes of the IMU (e.g., by subtracting a constant offset from the gyroscope data while ignoring IMU data from one or more other sensors of the IMU such as ignoring data from an accelerometer of the IMU when the motion of the moving platform includes acceleration). In another example scenario, when the velocity of the moving platform is substantially constant, the electronic device may continue to use accelerometer data from the accelerometer for continued tracking of the motion of the electronic device.

An electronic device such as electronic device 100a may track the motion of the moving platform 304 using information received from the moving platform itself (e.g., using sensor data from one or more sensors, such as IMU sensors, exteroceptive sensors, and/or GPS sensors, coupled to or otherwise associated with the moving platform, and/or using motion information provided to the electronic device by the moving platform) and/or based on sensor data such as IMU data obtained by the electronic device and that is indicative of platform motion. Sensor data from sensors 129 that is indicative of platform motion may include sensor data that indicates smoothly continuous acceleration, deceleration, or constant motion that is characteristic of a generic moving platform or that is characteristic of a particular moving platform. For example, for moving platforms such as cars, busses, trains, airplanes, or the like, portions of the sensor data may indicate smooth motion and/or acceleration that is distinct from the characteristics of motion data caused by human-generated motion such as walking, running, standing, sitting, and/or looking around. In other examples, such as for small moving platforms such as bicycles, golf carts, skateboards, or other human-powered moving platforms, the sensor data may include characteristic motion data for human motions corresponding to that platform (e.g., peddling motions, pushing motions, rowing motions, etc.) that themselves can affect and/or determine the motion of the moving platform. Once the motion 322 of the moving platform has been determined, this motion can be removed from detected device motion that is used to determine where and/or how to display virtual content such as virtual object 320 in a virtual or mixed reality setting.

In one or more implementations, sensors 129 of electronic device 100a include an optical sensor (e.g., an imaging sensor and/or a camera), a depth sensor, and an IMU. Device motion may initially be identified with the IMU. If the device motion that is determined using the IMU is determined to include motion due to a coupling 306 of the electronic device 100a to a moving platform 304, virtual content such as virtual object 320 may be displayed, anchored to an anchoring location that is fixed relative to the moving platform, using the optical sensor and the depth sensor, using reduced data from the IMU (e.g., some or all of the sensor data from the IMU data may be ignored and/or some or all of the sensors of the IMU may be disabled to prevent motion of the moving platform from influencing the display of virtual content). In some implementations, only a portion of the IMU data that corresponds to the device motion may be ignored. For example, in some operational scenarios, only one or a subset of the sensors of the IMU may be used for continued tracking of the motion of the electronic device. For example, only a magnetometer, only one or more gyroscopes (e.g., when the motion of the moving platform is determined to be non-rotational motion), only an accelerometer (e.g., when the motion of the moving platform is determined to be constant-velocity motion), or a combination of these IMU sensors that includes less than all of the sensors of the IMU can be used for the continued tracking in various operational scenarios.

In the example of FIG. 3, the motion 322 of electronic device 100a is the same as, and entirely due to the motion 322 of moving platform 304 (e.g., the electronic device 100a is fixed or stationary relative to the moving platform, even though the system is moving relative to the physical ground 302). However, in other scenarios, electronic device 100a can be moved relative to the moving platform in addition to being moved by the moving platform.

Figure 4:
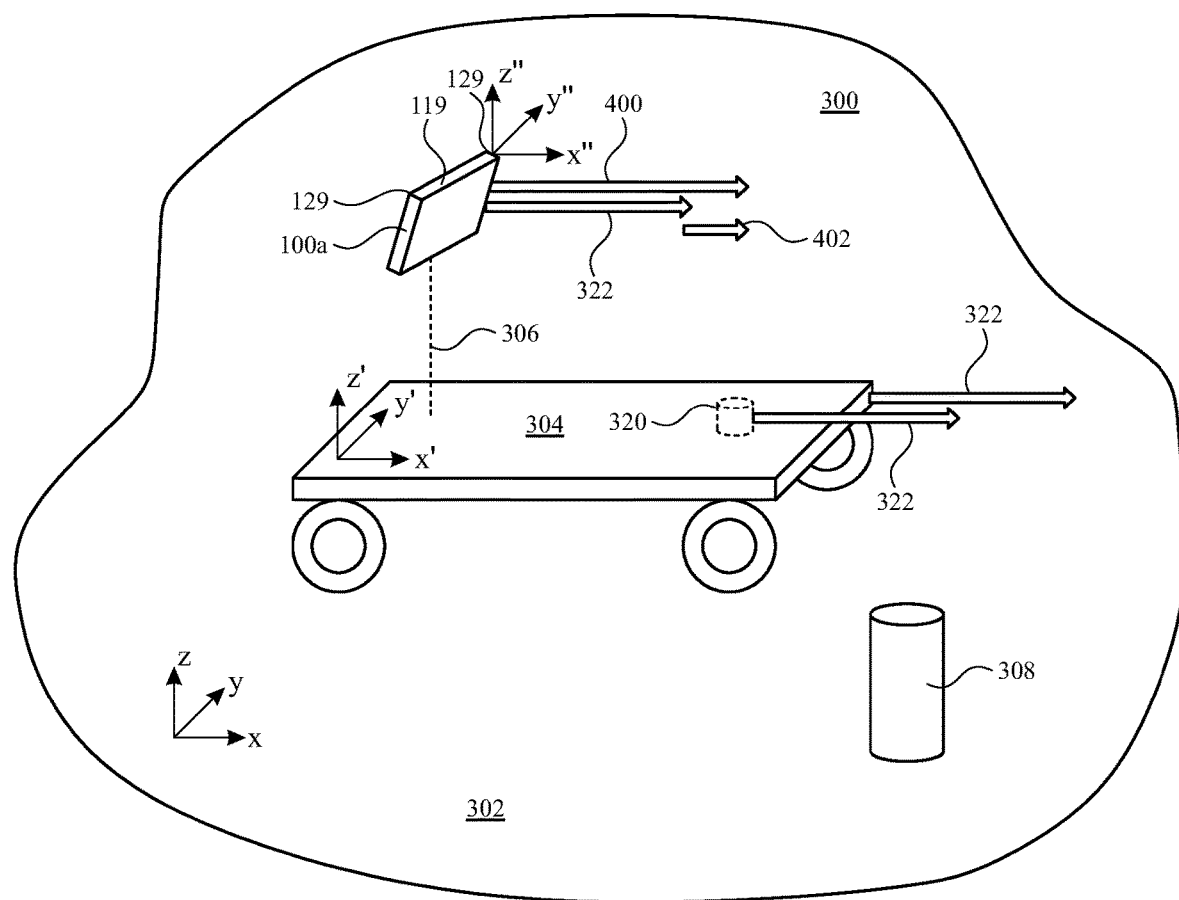
FIG. 4 illustrates an example in which an electronic device is moving with and relative to a moving platform in accordance with implementations of the subject technology.

For example, FIG. 4 illustrates a scenario in which electronic device 100a is moving with a motion 400 that includes a first component (e.g., the motion 322 due to the motion 322 of moving platform 304) and a second component such as an additional motion 402. The additional motion 402 may be caused by, for example, a user or a wearer of electronic device 100a walking or otherwise moving around on the moving platform. In the example of FIG. 4, the additional motion 402 is illustrated as linear motion in the same direction as motion 322. However, in various scenarios, the motion 400 of electronic device 100a can include various components that are separate from the motion 322 of the moving platform, such as rotational motion of the electronic device 100a and/or other linear or non-linear translational motions of the electronic device 100a relative to the moving platform and relative to any anchoring locations that are fixed relative to the moving platform.

In one or more implementations, additional motion 402, such as rotational motion and/or translational motion of the electronic device 100a that is separate from the motion 322 of the moving platform, can be detected and/or tracked using the optical and/or depth sensors of sensor 129 (e.g., as the wearer looks and/or moves about the moving platform), so that virtual object 320 can be displayed at a fixed location on the moving platform even as the electronic device moves within the physical setting 300 with motion 322 and additional motion 402.

In one or more implementations, an electronic device such electronic device 100a that is on a moving platform such as moving platform 304 may track the motion of the moving platform 304 (e.g., which may be also correspond to a first component of the motion of the electronic device itself) using a first simultaneous localization and mapping (SLAM) system. The first SLAM system may include one or more sensors such as sensors 129 of the electronic device, and/or one or more additional sensors (e.g., an external sensor 250 such as a separate IMU and/or a GPS sensor) on the moving platform. The one or more additional sensors may be configured to provide platform motion information to one or more processors of the electronic device or to provide sensor information by which the one or more processors of the electronic device can determine the platform motion information.

In one or more implementations, the electronic device such as electronic device 100a that is on the moving platform such as moving platform 304 may also track motion of the electronic device (e.g., a second component of the motion of the electronic device such as additional motion 402) that is separate from the motion of the moving platform using a second SLAM system. The second SLAM system may include, for example one or more sensors such as sensors 129 of the electronic device.

In the examples of FIGS. 3 and 4, the virtual object 320 is displayed so as to appear stationary at a location on or within moving platform 304 without being anchored to a particular object in the physical setting. In one or more implementations, virtual object may be anchored to a physical object on or associated with the moving platform.

Figure 5:
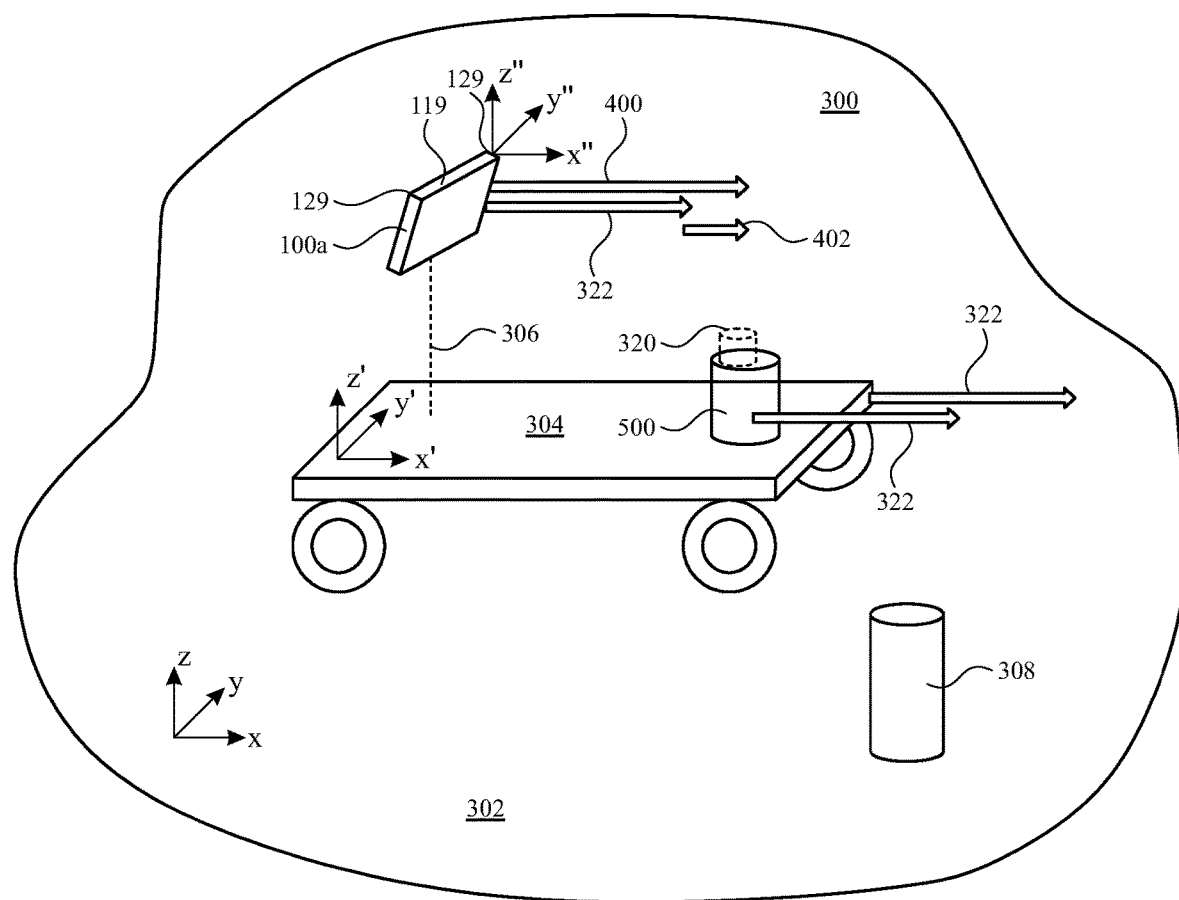
FIG. 5 illustrates an example in which virtual content is anchored to a physical object that is moving with a moving platform in accordance with implementations of the subject technology.

FIG. 5 illustrates an example in which virtual object 320 is anchored to a physical object 500 on moving platform 304. As shown, physical object 500 is moving with a motion 322 that is equal to and caused by the motion 322 of moving platform 304. For example, physical object 500 may be a structural portion of the moving platform itself or may be an object that is resting on or within and/or mechanically attached to the moving platform. In one or more implementations, the physical object 500 may be, as examples, a seat on a train, a structural portion of a vehicle, a table on a recreational vehicle (RV), or a door of an airplane. In one or more implementations, physical object 500 may be a location indicator that is configured for recognition by electronic device 100*a*. For example, a location indicator may be a cross-hairs or a location indicator that is encoded into another feature of the moving platform so as to be generally hidden or unrecognizable to a person (e.g., an encoded portion of a logo of a vehicle manufacturer or an encoded portion of a wall decoration on a train). Such location indicators may be recognized by electronic device 100*a* to orient the electronic device to a frame of reference that is fixed to the moving platform.

In one or more implementations, electronic device 100*a* may anchor the virtual object 320 to an anchoring location that is fixed relative to the moving platform 304 by detecting an object such as physical object 500 with one or more sensors of sensors 129 (e.g., using camera 119 and/or a depth sensor of sensor 129), and anchoring the virtual content to the detected object. Prior to anchoring the virtual content to the detected object, the electronic device may determine that the object has a motion 322 that is equal to the motion 322 of the moving platform 304 (e.g., by determining that changes in position of object detected by the optical and/or depth sensors of the electronic device 100*a* is due to motion of the electronic device 100*a* other than motion due to the moving platform).

In the example of FIG. 5, the physical object 500 to which virtual object 320 is anchored is stationary on the moving platform. However, in other scenarios, physical object 500 may be moving relative to the moving platform. For example, the physical object 500 may be an object being held by another person that is moving about the moving platform. As another example, the physical object 500 may be an object such as a table in an RV that is resting on, but not attached to, the floor of the RV. In this example, when the RV hits a bump, the table may move up and down and/or side to side due to the bump. In various example scenarios, the physical object 500 to which the virtual object 320 is anchored may begin to move relative to the moving platform 304. In a scenario in which a physical object on the moving platform begins to move, an electronic device such as electronic device 100*a* may detect a motion of the object relative to the moving platform and relative to electronic device, and may continue anchoring the virtual content to the object based on the detected motion of the object and/or based on the motion of the electronic device that is separate from the motion caused by the moving platform. For example, a virtual cup that is anchored to a physical table on an RV may remain anchored to the physical table (e.g., using optical and/or depth tracking of the table using camera(s) 119 and/or sensors 129) when the table moves due to a bump in the road.

For example, optical and/or depth sensor information from sensors 129 can be used to determine that some objects on the moving platform 304 are changing position relative to the electronic device due only to motion of the electronic device other than motion due to the moving platform, and that other objects such as physical object 500 are changing position relative to the electronic device and/or relative to the moving platform in a way that cannot be attributed to motion of the electronic device itself or to motion of the moving platform.

In another example, a virtual cup may be displayed to appear on a table in an RV, but be anchored relative to the floor or another structure of the RV itself, and can remain stationary relative to the RV even if the table on which the virtual cup is displayed begins to move.

In the examples of FIGS. 3-5, electronic device 100*a* is described as detecting and/or tracking motion of objects (and/or portions of the physical setting of the electronic device) that are moving with a motion that includes at least a component that is due to the motion of the moving platform. In one or more implementations, an electronic device such as electronic device 100*a* (e.g., that is on a moving platform such as moving platform 304 in a physical setting such as physical setting 300) may detect a portion of a physical setting having a motion that is different from the motion of the moving platform and different from the device motion of the electronic device. For example, an electronic device such as electronic device 100*a* may detect the portion of the physical setting having the motion that is different from the motion of the moving platform and different from the device motion of the electronic device. In one or more implementations, the detection of the portion of the physical setting having the motion that is different from the motion of the moving platform and different from the device motion of the electronic device may include a vision-based detection of the motion that is different from the motion of the moving platform and different from the device motion of the electronic device. A vision-based detection may be a detection that is based on visual information from one or more cameras and/or depth sensors on the electronic device. One example of a vision-based detection can include detecting an optical flow associated with the portion of the physical setting using an optical sensor such as an optical sensor of sensors 129 and/or a camera such as camera 119. In one or more implementations, the vision-based detection may include comparing motion detected by a first camera of an electronic device with motion detected by another camera of the device (e.g., first and second cameras having different fields of view). In one or more implementations, two different motions of two different portions of a scene may be identified in a sequential image frames from a single camera. In one or more implementations, sensor data such as depth sensor data or ranging data (e.g., Doppler data, etc.) from sensors on the electronic device and/or on the moving platform may be used, in addition to image data, to detect motions of portions of a physical setting scene that are different from the motion(s) of other portions of the physical setting scene.

Figure 6:
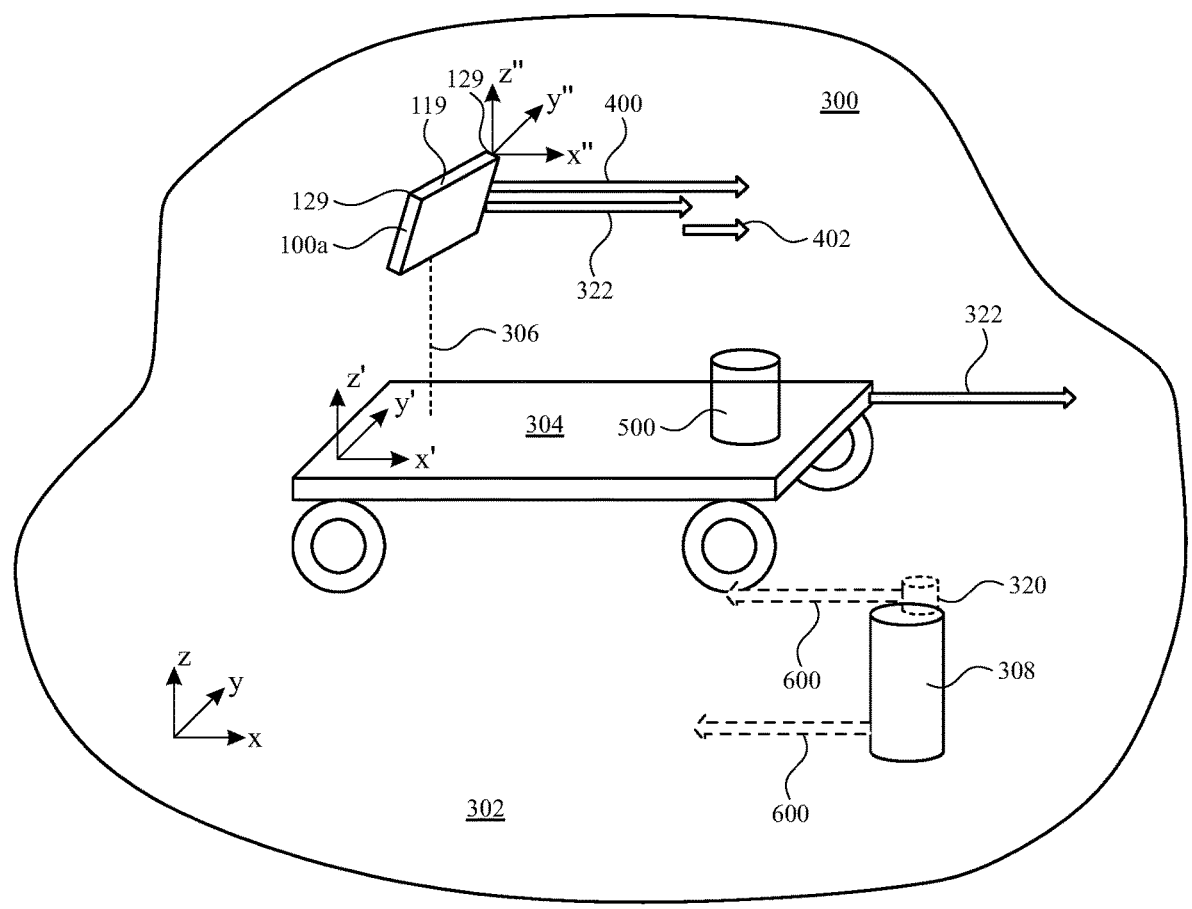
FIG. 6 illustrates an example in which virtual content is anchored, by a device on a moving platform, to a physical object that is stationary in a fixed reference frame accordance with implementations of the subject technology.
Figure 7:
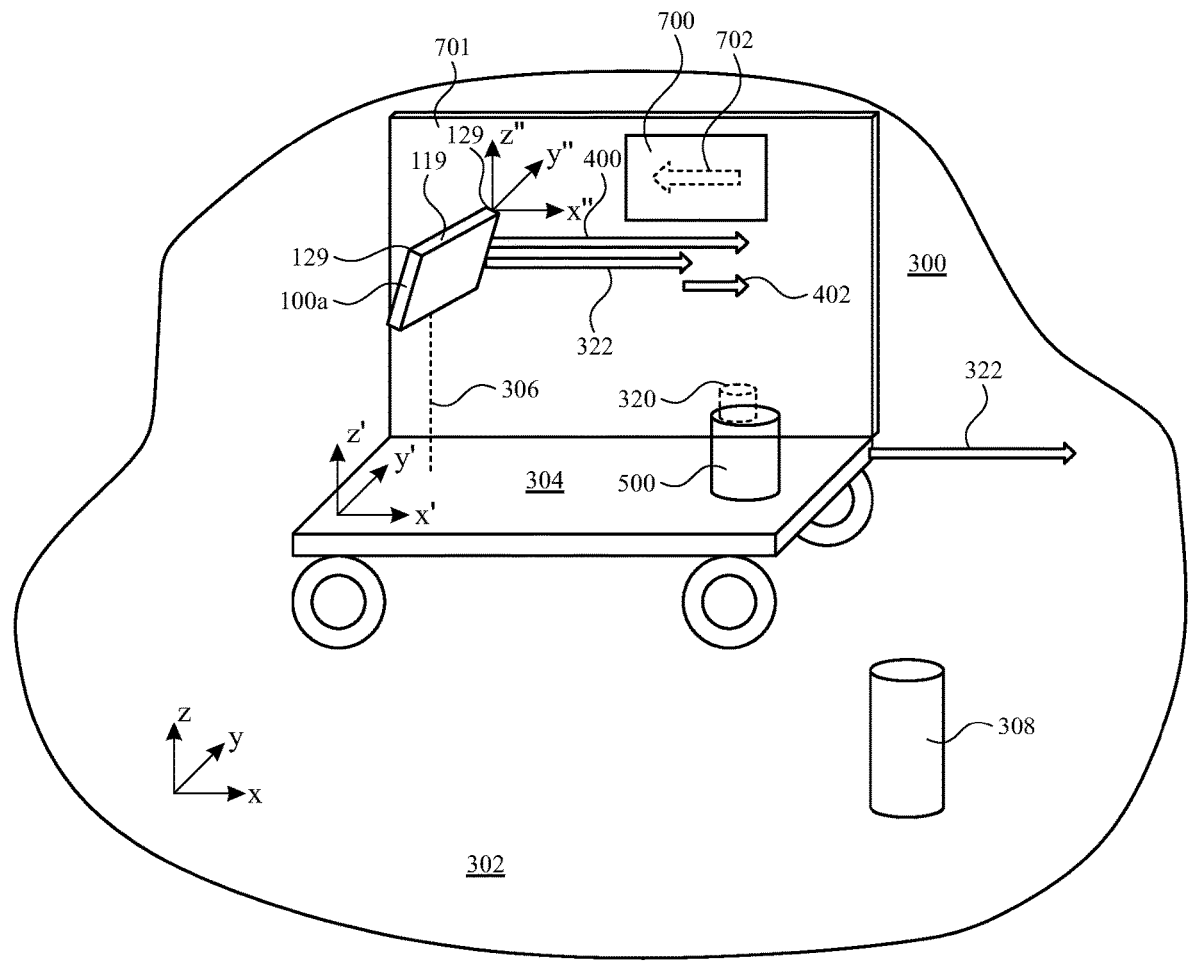
FIG. 7 illustrates an example of a physical setting of an electronic device in which a portion of the physical setting is moving differently than the electronic device and differently from a moving platform in the physical setting in accordance with implementations of the subject technology.
Figure 8:
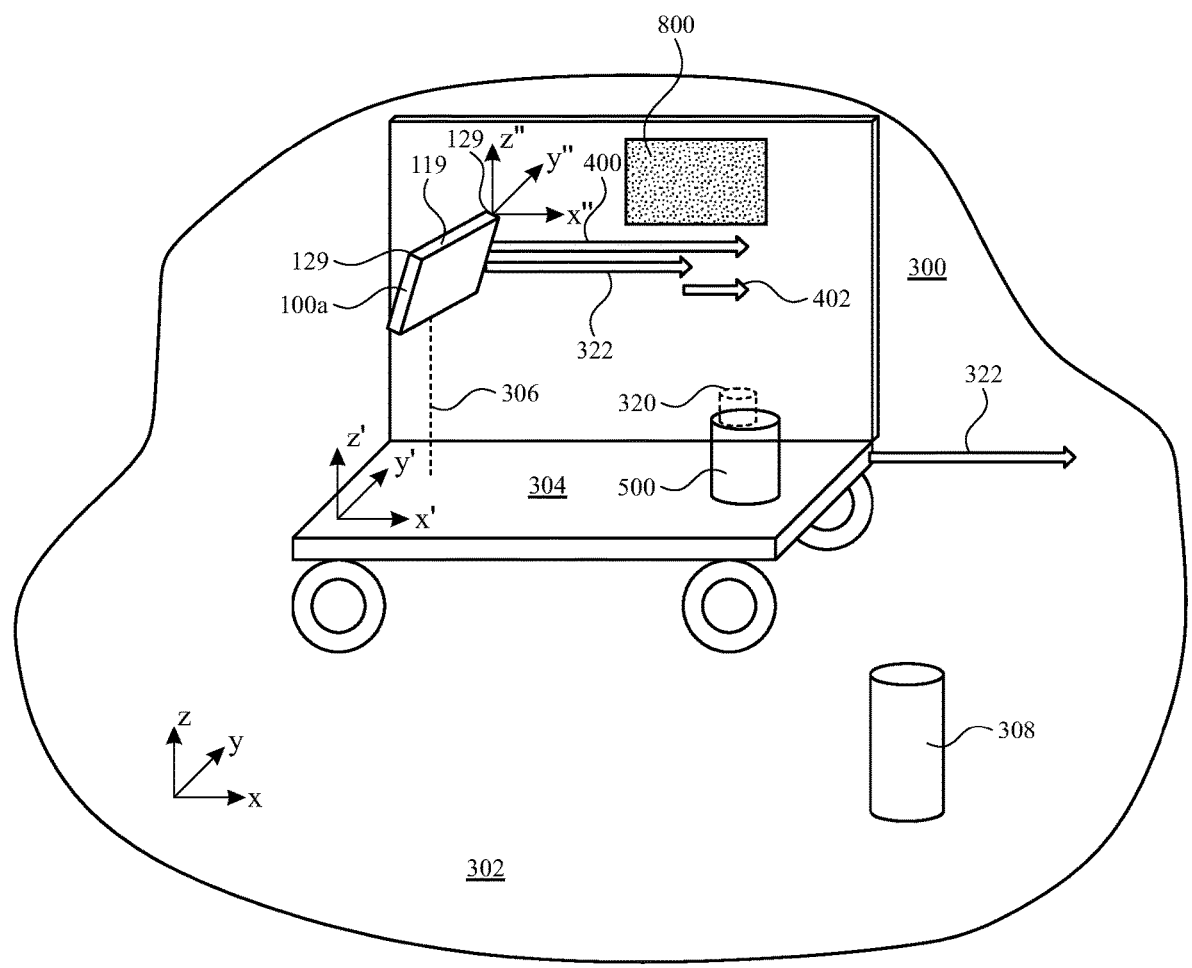
FIG. 8 illustrates an example of virtual content rendered over the portion of the physical setting of FIG. 7 in accordance with implementations of the subject technology.

FIGS. 6, 7, and 8 illustrate example scenarios in which a portion of a physical setting is detected as having a motion that is different from the motion of the moving platform and different from the device motion of the electronic device. The portion of the physical setting may include, for example, a portion of the physical setting that is external to the moving platform (e.g., as viewed through a window, a door, or an opening in in the moving platform). The portion of the physical setting may include the physical ground 302, one or more physical objects such as physical object 308 that are stationary with respect to (and/or fixed to) the physical ground 302, and/or one or more objects (e.g., other cars, trains, ships, trucks, animals, people etc.) that are moving relative to the physical ground 302 but separately from the motion of the moving platform.

FIG. 6 illustrates an example in which virtual content being displayed by an electronic device, such as electronic device 100*a*, that is moving with a moving platform, is displayed outside of the moving platform and with a motion that is different from the motion of the moving platform. In the example of FIG. 6, virtual object 320 is displayed at the location of (e.g., and anchored to) physical object 308, which is stationary with respect to the physical ground 302. In this example, electronic device 100a may detect motion 600 of the physical object 308 (e.g., motion that is substantially opposite to the motion 322 of the moving platform 304) using camera(s) 119 and/or optical and/or depth sensors of sensors 129. In one or more implementations, one or more sensors on the moving platform (e.g., an IMU, a GPS sensor, a Doppler sensor, another ranging sensor or exteroceptive sensor such as an ultrasound sensor, lidar sensor, or a radar sensor, etc.) may also be used to detect the motion 600 of the physical object 308. Based on the detected location and/or motion of physical object 308, the electronic device may identify a location associated with the physical object 308 as an anchoring location for virtual content such as virtual object 320, and display the virtual content anchored to the physical object 308 as illustrated in FIG. 6. As shown, displaying the virtual object 320 anchored to physical object 308 may include displaying the virtual object such that the virtual object appears to be moving with a motion 600 (e.g., a motion that is equal to the motion 600 of the physical object 308) relative to the moving platform.

In various operational scenarios, virtual object 320 may be initially displayed anchored to physical object 308, or can be moved by the user from another location/object to the physical object 308. For example, electronic device 100a may receive an input from a user indicating a repositioning of virtual content such as virtual object 320. For example, the user may perform a gesture or other input to reposition the virtual content from a position on the moving platform 304 (e.g., one of the exemplary positions of virtual object 320 shown in FIG. 3, 4, or 5) to a position external to the moving platform, such as a position associated with a fixed reference frame such as the position of the virtual object 320 anchored to the physical object 308 as illustrated in FIG. 5. The user input may include a gesture corresponding to picking up the virtual object 320 and throwing it out the window of the moving platform, or placing the virtual object onto the physical object 308.

Responsive to the input, electronic device 100a may de-anchor the virtual content from an anchoring location that is fixed relative to the moving platform (e.g., an anchoring location that is moving with the moving platform and/or associated with an object such as physical object 500 on the moving platform). Electronic device 100a may then display the virtual content anchored to a portion of the physical setting that was determined as having a motion that is different from the motion of the moving platform and different from the device motion of the electronic device 100a (e.g., anchored to the physical object 308).

In one or more implementations, when a portion of the physical setting of an electronic device such as electronic device 100a is determined to have a motion that is different from the motion of the moving platform 304 and different from the device motion of the electronic device 100a itself by at least a threshold (e.g., based on a vision-based detection such as an optical flow detection of the portion of the environment, based on SLAM monitoring of the portion of the environment, and/or using one or more sensors such as IMU sensors, GPS sensors, and/or ranging sensors on the moving platform), that portion of the physical setting may be identified as ineligible for anchoring of virtual content.

For example, FIG. 7 illustrates an example operational scenario in which a portion 700 of the physical setting 300 (e.g., a portion of the physical setting that is visible to the cameras and/or optical sensors of the electronic device 100a through the window of a train) is moving differently than the motion of the moving platform 304, the motion of a wall 701 of the moving platform (e.g., the wall of a plane, a ship, an airplane, etc.), and the motion of objects such as physical object 500 on the moving platform. For example, the portion 700 may be detected as having motion 702 that is substantially opposite in direction to the motion of the moving platform 304 and/or that is substantially different than the motion of another portion of the environment). For example, in a sequence of images captured by camera(s) 119 (e.g., a single camera 119 or multiple cameras 119 such as multiple cameras having different fields of view) of electronic device 100a, the portion 700 may have a motion that is detectable in the images (e.g., using computer vision such as by detecting an optical flow in the images) that is different from the motion (e.g., the optical flow) of another portion of the physical setting that includes the moving platform 304, the wall 701 of the moving platform, and objects such as physical object 500 on the moving platform. For example, if a device such as electronic device 100a is stationary on a moving train with a window in the field of view of camera(s) 119, most pixels in the images of the camera will remain unchanged from image frame to image frame (e.g., zero or small optical flow), while pixels representing objects outside the window will change from image frame to image frame with a bulk motion in the opposite direction of the motion of the train. This bulk motion of the objects represented in the pixels corresponding to the location of the window represents an optical flow in a video stream from the camera. In the same scenario, if the wearer of electronic device 100a turns their head, an additional bulk motion of the remaining pixels (e.g., an additional optical flow in the video stream) will be introduced from image frame to image frame in the opposite direction to the head turn. However, this optical flow corresponding to the change in the view of the interior of the train due to the head turn will be different from the continuing optical flow of objects outside the window, and can be detected as such. In various implementations, the motion and/or optical flow of portion 700 may be determined to be different from the motion and/or optical flow of other portions, and/or to be due to known motion of the moving platform, and/or to be unattributable to the motion of the device itself relative to the moving platform. In one example, bulk motion that is detectable in the images from all of the cameras of the device may be determined to be due to motion of the device itself, and motion in images from only one of the cameras, a subset of the cameras, or a subset of the pixels of the images from one of the cameras, may be determined to represent motion of portions of the physical setting that are external to the moving platform.

In one or more implementations, portion 700 can be identified as ineligible for anchoring and/or display of virtual content by electronic device 100a (e.g., if the speed and/or direction corresponding to motion 702 is different from the motion of other portion(s) of the physical setting by more than a threshold), and the electronic device may display a corresponding indication of the same. In one or more implementations, electronic device 100a may display additional virtual content overlaid on the portion of the physical setting and fixed relative to the moving platform (e.g., to block a view of the portion of the physical setting).

For example, FIG. 8 illustrates an operational scenario in which additional virtual content 800 is displayed (e.g., by display 225 of electronic device 100a) overlaid on the portion of the physical setting and fixed relative to the moving platform 304 to block a view of the portion 700 of the physical setting 300. Blocking the portion of the physical setting that is external to the moving platform may, for example, reduce the processing resources used by an electronic device such as electronic device 100a (e.g., processing resources that may otherwise be used to track the motion of the moving platform using a separate SLAM system or by using a vision-based tracking of that portion of the scene).

Figure 9:
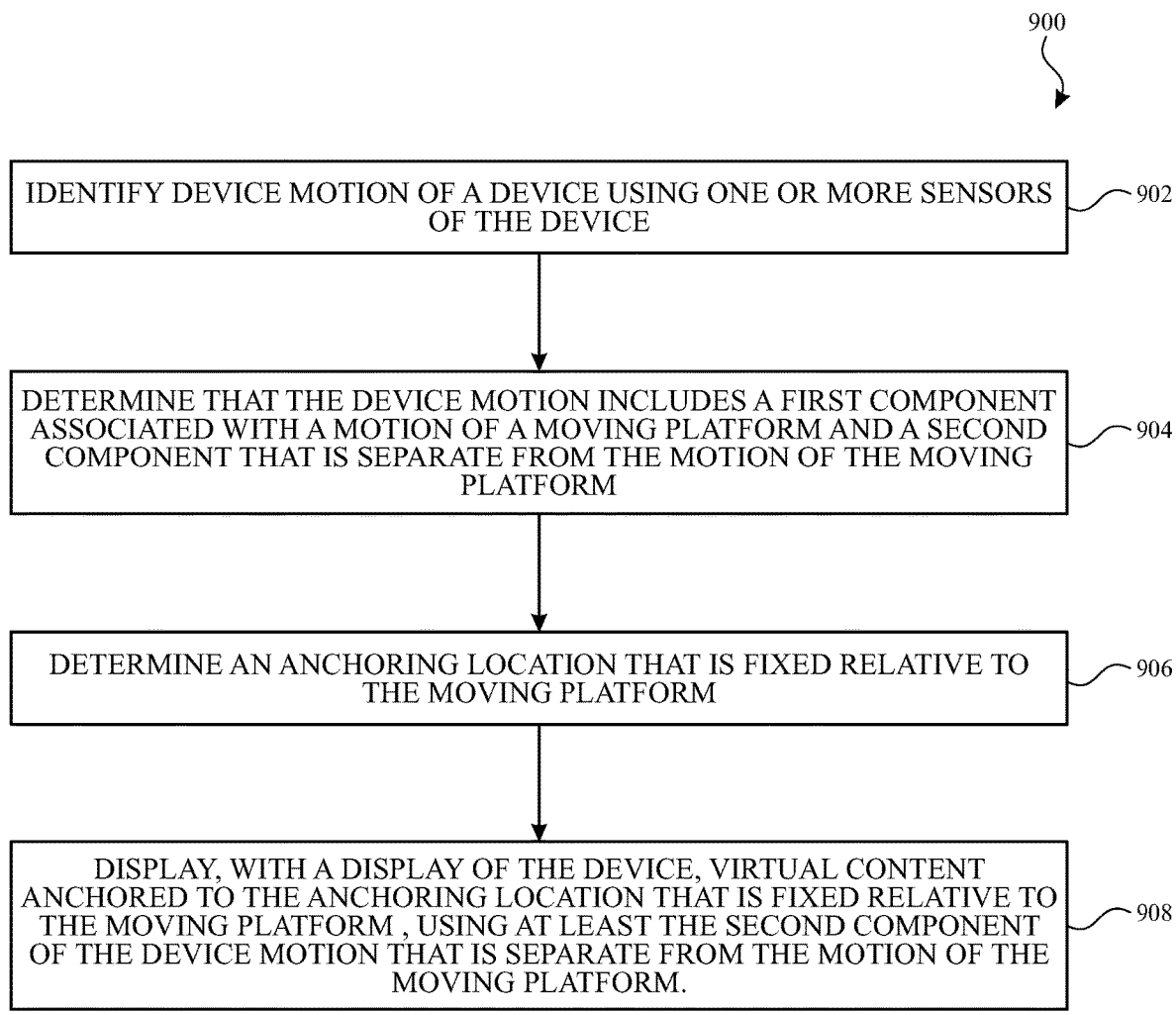
FIG. 9 illustrates a flow chart of example operations that may be performed for providing extended reality for moving platforms in accordance with implementations of the subject technology.

FIG. 9 illustrates a flow diagram of an example process 900 for providing an XR setting on a moving physical platform in accordance with implementations of the subject technology. For explanatory purposes, the process 900 is primarily described herein with reference to the electronic device 100a of FIGS. 1A, 1B, and 2. However, the process 900 is not limited to the electronic device 100a of FIGS. 1A, 1B, and 2, and one or more blocks (or operations) of the process 900 may be performed by one or more other components of other suitable devices, including the electronic device 100b and/or the electronic device 100c. Further for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

As illustrated in FIG. 9, at block 902, an electronic device such as electronic device 100a identifies device motion of the electronic device using one or more sensors (e.g., camera(s) 119 and/or sensors 129) of the electronic device.

At block 904, the electronic device determines that the device motion includes a first component associated with a motion of a moving platform, and a second component that is separate from the motion of the moving platform. The second component of the device motion that is separate from the motion of the moving platform may include a rotational motion of the electronic device and/or a translational motion of the electronic device relative to the moving platform (e.g., due to motion on or within the moving platform of a wearer of an electronic device 100a corresponding to the electronic device).

At block 906, the electronic device determines an anchoring location that is fixed relative to the moving platform. Determining the anchoring location may include identifying and tracking a location, in the physical setting of the electronic device, that is part of the moving platform and/or that is moving with the moving platform.

At block 908, the electronic device displays virtual content anchored to the anchoring location that is fixed relative to the moving platform, using at least the second component of the device motion that is separate from the motion of the moving platform. For example, the electronic device may modify the location and/or size of the virtual content to counter the second component of the motion of the electronic device (e.g., the component of the motion of the electronic device that is not caused by the motion of the moving platform). In one or more implementations, the one or more sensors include an optical sensor, a depth sensor, and an inertial measurement unit, the electronic device identifies the device motion with the inertial measurement unit, and displays the virtual content anchored to the anchoring location that is fixed relative to the moving platform using the optical sensor and the depth sensor without further input from one or more portions of the inertial measurement unit.

In one or more implementations, the virtual content is displayed as part of a virtual setting that entirely blocks the physical setting from a view of a user. In such virtual reality implementations, the anchoring location may be located with respect to the physical setting, even though the user may be unable to see the physical setting. For example, to create an entirely virtual setting that a user can explore, while the user is on a moving platform, the virtual setting itself and/or one or more virtual objects in the virtual setting can be anchored to the moving platform. In this way, the user can move about and/or explore the virtual setting by physically moving around and/or exploring the moving platform. In one or more other implementations, the virtual content is displayed to appear at the anchoring location in the physical setting (e.g., in a mixed reality and/or augmented reality application).

In one or more implementations, the electronic device may anchor the virtual content to the anchoring location that is fixed relative to the moving platform by detecting an object with the one or more sensors, determining that the object has an object motion that is equal to the motion of the moving platform, and anchoring the virtual content to the object (e.g., as described herein in connection with FIG. 5). In one or more implementations, the electronic device may detect a motion of the object relative to the moving platform and relative to electronic device, and continue anchoring the virtual content to the object based on the detected motion of the object and/or based on motion of the electronic device that is separate from the motion caused by the moving platform.

In one or more implementations, the electronic device may detect a portion of a physical setting having a motion that is different from the motion of the moving platform and different from the device motion of the electronic device (e.g., as described herein in connection with FIGS. 6, 7, and 8). For example, the portion of the physical setting may include a scene outside of a window of the moving platform and/or an object that is fixed to a fixed reference frame (e.g., a reference frame such as the (x, y, z) reference frame that is fixed to the physical ground at or near the location of the electronic device) for the moving platform and the electronic device. In one or more implementations, the electronic device may determine that the motion (e.g., motion 702 of FIG. 7) of the portion of the physical setting is different from the motion of the moving platform and different from the device motion of the electronic device by at least a threshold, and may identify the portion of the physical setting as ineligible for anchoring of virtual content. In one or more implementations, the electronic device may display additional virtual content (e.g., additional virtual content 800 of FIG. 8) overlaid on the portion of the physical setting and fixed relative to the moving platform to block a view of the portion of the physical setting.

In one or more implementations, the electronic device may determine that the portion of the physical setting has the motion that is different from the motion of the moving platform and different from the device motion of the electronic device by performing a vision-based detection of the motion that is different from the motion of the moving platform and different from the device motion of the device (e.g., using images from one or more cameras of the electronic device). Performing a vision-based detection may include detecting an optical flow associated with the portion of the physical setting, using an optical sensor of the one or more sensors (e.g., an optical sensor such as a camera or other optical or imaging sensor).

In one or more implementations, the electronic device may receive an input from a user indicating a repositioning of the virtual content. The input from the user may be a gesture input (e.g., as detected using camera(s) 119 and/or sensors 129) or an input to an input component of an XR system such as a handheld controller, a button, a joystick, a touchscreen, another touch sensor, or the like. Responsive to the input, the electronic device may de-anchor the virtual content from the anchoring location that is fixed relative to the moving platform, and display the virtual content anchored to the portion of the physical setting (e.g., as described above in connection with FIG. 6).

In one or more implementations, the electronic device (e.g., electronic device 100a) may track the motion of the moving platform 304 using a first simultaneous localization and mapping system and track the second component that is separate from the motion of the moving platform using a second simultaneous localization and mapping system. In one or more implementations, the second simultaneous localization and mapping system includes the one or more sensors of the electronic device. In one or more implementations, the first simultaneous localization and mapping system includes at least one additional sensor that is on the moving platform and/or configured to provide platform motion information to the one or more processors of the electronic device.

Various processes defined herein consider the option of obtaining and utilizing a user's personal information. For example, such personal information may be utilized in order to provide extended reality for moving platforms. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

In accordance with aspects of the subject disclosure, a method is provided that includes identifying device motion of a device using one or more sensors of the device; determining that the device motion includes a first component associated with a motion of a moving platform and a second component that is separate from the motion of the moving platform; determining an anchoring location that is fixed relative to the moving platform; and displaying, with a display of the device, virtual content anchored to the anchoring location that is fixed relative to the moving platform, using at least the second component of the device motion that is separate from the motion of the moving platform.

In accordance with aspects of the subject disclosure, a device is provided that includes a display; one or more sensors; and one or more processors configured to: identify device motion of the device using the one or more sensors; determine that the device motion includes a first component associated with a motion of a moving platform and a second component that is separate from the motion of the moving platform; determine an anchoring location that is fixed relative to the moving platform; and display virtual content anchored to the anchoring location that is fixed relative to the moving platform, using at least the second component of the device motion that is separate from the motion of the moving platform.

In accordance with aspects of the subject disclosure, a non-transitory computer-readable medium is provided that includes instructions, which when executed by a computing device, cause the computing device identify device motion of a device using one or more sensors of the device; determine that the device motion includes a first component associated with a motion of a moving platform and a second component that is separate from the motion of the moving platform; determine an anchoring location that is fixed relative to the moving platform; and display virtual content anchored to the anchoring location that is fixed relative to the moving platform, using at least the second component of the device motion that is separate from the motion of the moving platform.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A device, comprising:
   a display;
   a plurality of sensors including at least a plurality of inertial measurement unit sensors; and
   one or more processors configured to:
      identify device motion of the device using the plurality of inertial measurement unit sensors;
      determine that the device motion includes a first component associated with a motion of a moving platform and a second component that is separate from the motion of the moving platform;
      determine an anchoring location that is fixed relative to the moving platform; and
      display virtual content anchored to the anchoring location that is fixed relative to the moving platform, using less than all of the plurality of inertial measurement unit sensors to track the second component of the device motion that is separate from the motion of the moving platform.

2. The device of claim 1, wherein the one or more sensors comprises an optical sensor, a depth sensor, and an inertial measurement unit comprising the plurality of inertial measurement unit sensors, wherein the plurality of inertial measurement unit sensors comprises an accelerometer, a gyroscope, and a magnetometer, wherein the one or more processors are configured to identify the device motion with the inertial measurement unit and to display the virtual content anchored to the anchoring location that is fixed relative to the moving platform using the optical sensor, and the depth sensor without further input from the inertial measurement unit.

3. The device of claim 1, wherein the second component of the device motion that is separate from the motion of the moving platform comprises a rotational motion of the device.

4. The device of claim 3, wherein the second component of the device motion that is separate from the motion of the moving platform includes a translational motion of the device relative to the moving platform and the anchoring location.

5. The device of claim 1, wherein the one or more processors are configured to anchor the virtual content to the anchoring location that is fixed relative to the moving platform by:
   detecting an object with one or more sensors of the device;
   determining that the object has an object motion that is equal to the motion of the moving platform; and
   anchoring the virtual content to the object.

6. The device of claim 5, wherein the one or more processors are further configured to:
   detect a motion of the object relative to the moving platform and relative to the device; and
   continue anchoring the virtual content to the object based on the detected motion of the object.

7. The device of claim 1, wherein the one or more processors are further configured to:
   detect a portion of a physical setting having a motion that is different from the motion of the moving platform and different from the device motion of the device.

8. The device of claim 7, wherein the one or more processors are further configured to:
   determine that the motion of the portion of the physical setting is different from the motion of the moving platform and different from the device motion of the device by at least a threshold; and
   identify the portion of the physical setting as ineligible for anchoring of virtual content.

9. The device of claim 8, wherein the one or more processors are further configured to display additional virtual content overlaid on the portion of the physical setting and fixed relative to the moving platform to block a view of the portion of the physical setting.

10. The device of claim 7, wherein the one or more processors are configured to detect the portion of the physical setting having the motion that is different from the motion of the moving platform and different from the device motion of the device by detecting an optical flow associated with the portion of the physical setting using an optical sensor of the device.

11. The device of claim 7, wherein the one or more processors are further configured to:
    receive an input from a user indicating a repositioning of the virtual content; and
    responsive to the input:
       de-anchor the virtual content from the anchoring location that is fixed relative to the moving platform; and
       display the virtual content anchored to the portion of the physical setting.

12. The device of claim 11, wherein the portion of the physical setting includes an object that is fixed to a fixed reference frame for the moving platform and the device.

13. The device of claim 1, wherein the one or more processors are configured to track the motion of the moving platform using a first simultaneous localization and mapping system and to track the second component that is separate from the motion of the moving platform using a second simultaneous localization and mapping system.

14. The device of claim 13, wherein the second simultaneous localization and mapping system comprises one or more sensors of the device.

15. The device of claim 14, wherein the first simultaneous localization and mapping system comprises at least one additional sensor on the moving platform and configured to provide platform motion information to the one or more processors of the device.

16. A method, comprising:
    identifying device motion of a device using one or more sensors, including a plurality of inertial measurement unit sensors, of the device;
    determining that the device motion includes a first component associated with a motion of a moving platform and a second component that is separate from the motion of the moving platform;
    determining an anchoring location that is fixed relative to the moving platform; and
    displaying, with a display of the device, virtual content anchored to the anchoring location that is fixed relative to the moving platform, using less than all of the plurality of inertial measurement unit sensors to track the second component of the device motion that is separate from the motion of the moving platform.

17. The method of claim 16, wherein displaying the virtual content anchored to the anchoring location that is fixed relative to the moving platform comprises:

detecting an object that is stationary relative to the moving platform using the one or more sensors; and anchoring the virtual content to the object.

18. The method of claim 17, further comprising:

detecting a motion of the object relative to the moving platform and relative to device; and continuing to anchor the virtual content to the object based on the detected motion of the object.

19. A non-transitory computer-readable medium comprising instructions, which when executed by a computing device, cause the computing device to:

identify device motion of a device using one or more sensors, including a plurality of inertial measurement unit sensors, of the computing device;

determine that the device motion includes a first component associated with a motion of a moving platform and a second component that is separate from the motion of the moving platform;

determine an anchoring location that is fixed relative to the moving platform; and display virtual content anchored to the anchoring location that is fixed relative to the moving platform, using less than all of the plurality of inertial measurement unit sensors to track the second component of the device motion that is separate from the motion of the moving platform.

20. The non-transitory computer-readable medium of claim 19, wherein the virtual content is displayed as part of a virtual setting that entirely blocks a physical setting from a view of a user, or to appear as the anchoring location in the physical setting.

* * * * *